United States Patent
Wang

(10) Patent No.: US 7,024,351 B2
(45) Date of Patent: Apr. 4, 2006

(54) METHOD AND APPARATUS FOR ROBUST EFFICIENT PARSING

(75) Inventor: YeYi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 09/934,223

(22) Filed: Aug. 21, 2001

(65) Prior Publication Data

US 2003/0115039 A1    Jun. 19, 2003

(51) Int. Cl.
*G06F 17/27*    (2006.01)

(52) U.S. Cl. .............................. 704/9; 704/257; 704/2

(58) Field of Classification Search .................. 704/9, 704/2, 257
See application file for complete search history.

(56) References Cited

U.S. PATENT DOCUMENTS

| 5,532,694 | A | * | 7/1996 | Mayers et al. ................. 341/67 |
| 5,960,384 | A | * | 9/1999 | Brash ............................. 704/9 |
| 6,055,538 | A | * | 4/2000 | Kessenich et al. .......... 707/101 |
| 6,076,051 | A | * | 6/2000 | Messerly et al. .............. 704/9 |
| 6,615,172 | B1 | * | 9/2003 | Bennett et al. ............. 704/257 |
| 2002/0165707 | A1 | * | 11/2002 | Call .............................. 704/2 |

OTHER PUBLICATIONS

Carrano, "data abstraction and problem solving with C++: walls and mirrors", Second Edition, Addison Wesley Longman, Inc., 1998, ISBN 0-201-87402-4, p. 452-609.*

Alabiso, B. et al. "LEAP: Language Enabled Applications," Proceedings of the First Workshop on Human-Machine Conversation, Bellagio, Italy (Jul. 1997).

Lavie, A., "GLR*: A Robust Parser for Spontaneous Spoken Language," Proceedings of ESSLLI-96 work-shop on Robust Parsing, Prague, Czech Republic (Aug. 1996).

Miller, S. et al., "Hidden Understanding Models of Natural Language," Proceedings of the 31st Annual Meeting of the Association for Computational Linguistics, New Mexico State University (1994).

Ward, W., "The CMU Air Travel Information Service: Understanding Spontaneous Speech," Proceedings of the DARPA Speech and Natural Language Workshop (1990).

(Continued)

*Primary Examiner*—David D. Knepper
*Assistant Examiner*—Qi Han
(74) *Attorney, Agent, or Firm*—Theodore M. Magee; Westman, Champlin & Kelly, P.A.

(57) ABSTRACT

The present invention provides a method for improving the efficiency of parsing text. Aspects of the invention include representing parse tokens as integers where a portion of the integer indicates the location in which a definition for the token can be found. In a further aspect, an integer representing a token points to an array of tokens that can be activated by the token. In another aspect, a list of pointers to partial parses is created before attempting to parse a next word in the text string. The list of pointers includes pointers to partial parses that are expecting particular semantic tokens. A fourth aspect of the invention utilizes a data structure to list the semantic tokens that have been fully parsed for each span in the input text segment. When a token is fully parsed, the list is accessed to determine if the new token should be discarded.

5 Claims, 8 Drawing Sheets

OTHER PUBLICATIONS

Ward, W. "Understanding Spontaneous Speech: the Phoenix System," IEEE International Conference on Acoustics, Speech and Signal Processing (1991).

Microsoft Speech SDK with SAPI 5.0, 94 pages (Sep. 1999).

Wang, K., "An Event-Driven Model for Dialogue System," Proc. ICSLP-98, (Dec. 1998).

Gorrin, A. et al., "How May I Help You?" Speech Communications, vol. 23, (1997).

"A Stochastic Model of Human-Machine Interaction for Learning Dialog Strategies," IEEE Transactions on Speech and Audio Processing, vol. 8, No. 1, pp. 11-23, (Jan. 2000).

"The Thoughtful Elephant: Strategies for Spoken Dialog Systems," IEEE Transactions on Speech and Audio Processing, vol. 8, No. 1, pp. 51-62, (Jan. 2000).

"JUPITER: A Telephone-Based Conversational Interface for Weather Information," IEEE Transactions on Speech and Audio Processing, vol. 8, No. 1, pp. 85-96, (Jan. 2000).

Weimer-Hastings, Peter and Zipitria, Iraide, "Rules for Syntax, Vectors for Semantics," In: Proceedings of the Twenty-Third Annual Conference of the Cognitive Science Society, 1991.

Wang, Ye-Yi, "A Robust Parser for Spoken Language Understanding," Eurospeech 1999.

Wang, Ye-Yi, "Robust Language Understanding in Mipad," ICASSP, 2001.

Wang, K., "Implementation of Multimodal Dialog System Using Extended Markup Languages," 6 pages, Proc. of ICSCP 2000 (2000).

Wang, K., "A Plan-based Dialog System with Probabilistic Inferences," 5 pages, Proc. ICSCP—2000, Beijing, China (2000).

Wang, Y. "Robust Language Understanding in MIPAD," 4 pages, Proc. of Eurospeech Conference (2001).

* cited by examiner

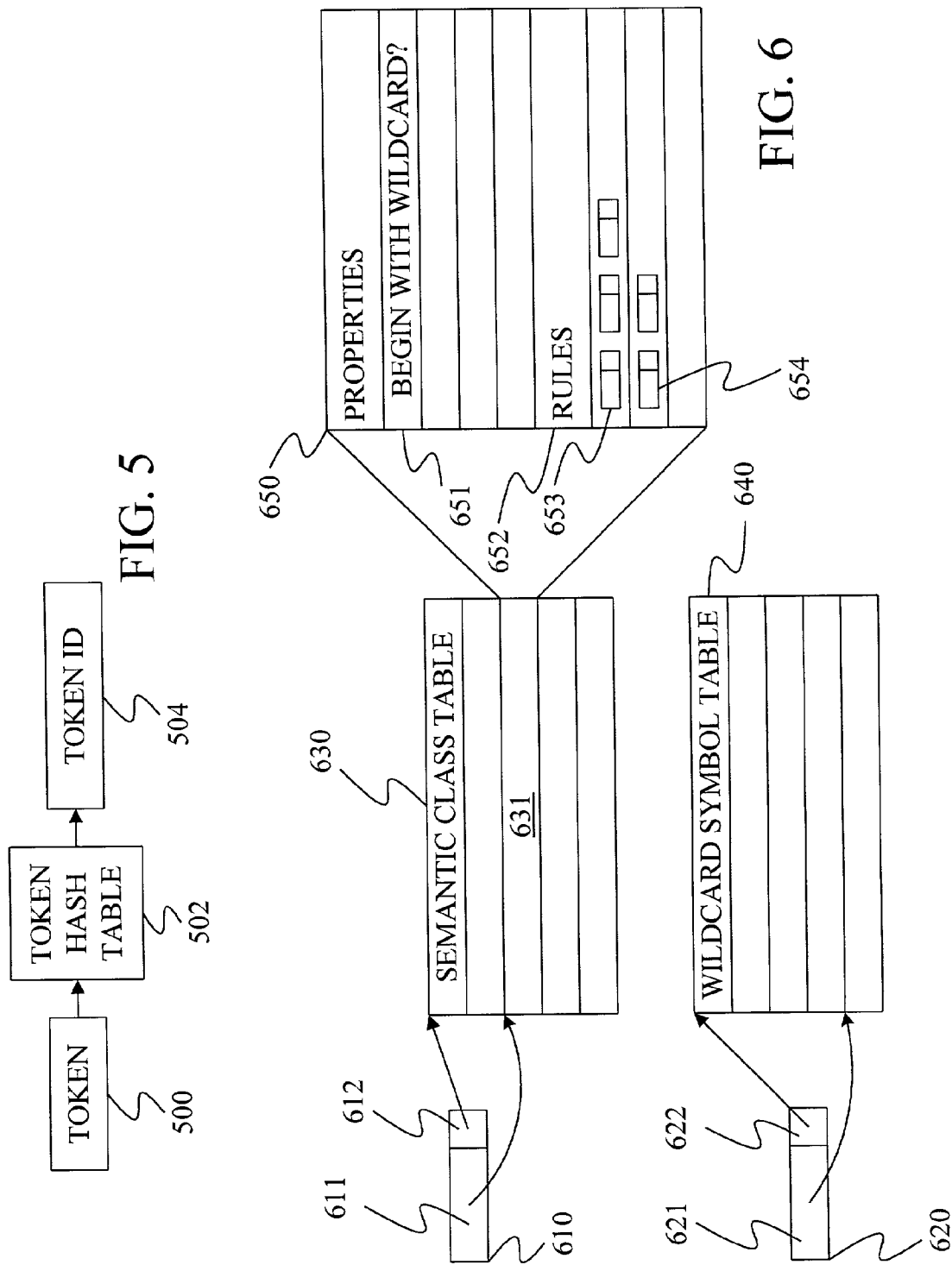

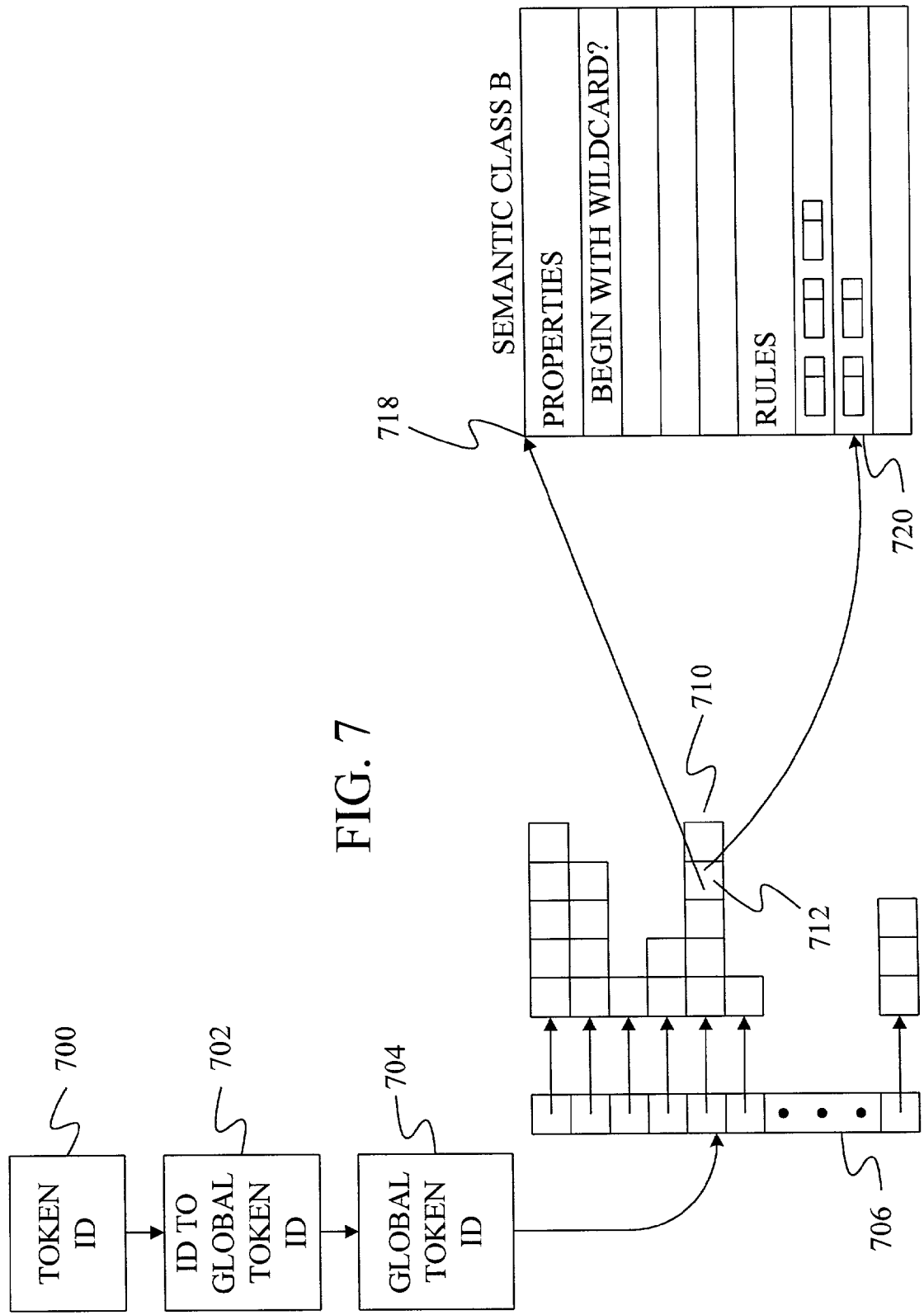

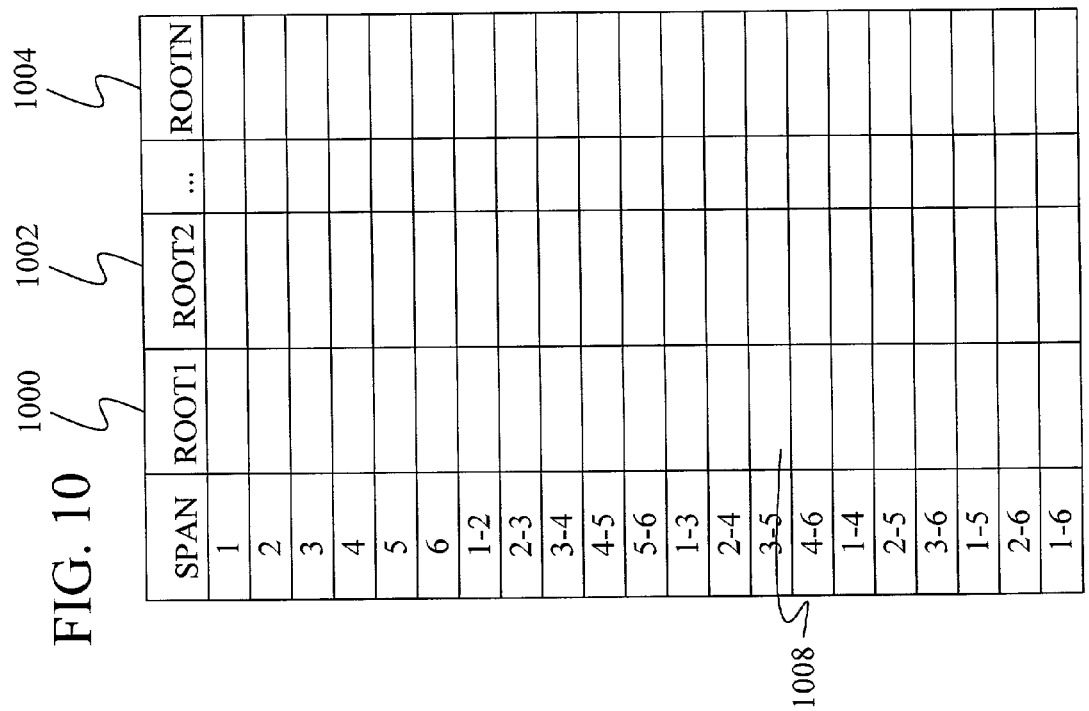

METHOD AND APPARATUS FOR ROBUST EFFICIENT PARSING

BACKGROUND OF THE INVENTION

The present invention relates to natural language understanding. In particular, the present invention relates to semantic and syntactic parsing of text strings.

In natural language understanding, computerized language systems attempt to identify a logical representation for a text string. In some systems, a semantic or meaning-based representation is formed by performing a semantic parse of the text. In other systems, a syntactic or grammar-based representation is formed by performing a syntactic parse of the text.

In many systems, the logical representation takes the form of a parse tree that has the words of the text as leaves and that has tokens at each of the nodes in the tree. Each token represents a logical abstraction for the words and tokens that are spanned by the token. A single token is at the root of the tree and spans the entire text.

In one type of parse, the parse tree is formed by selecting one word at a time from the text string. With each word, the parser first identifies those tokens that begin with the word. These tokens are then added as possible partial parses for the text string. In addition, the parser determines if any partial parses can be extended based on the word. At times, a word will complete a parse for a token. When this occurs, the completed token is used to identify other tokens that begin with the completed token. In addition, the partial parses are examined to determine if they can be extended by the completed token.

In the past, the process of identifying tokens that could use a completed token was computationally intensive, and therefore slowed the parsing of the text. In addition, to identify which partial parses could be extended by a word or completed token, all of the possible partial parses were examined under the prior art. Since there can be a large number of possible partial parses, this also slows the parsing of the text.

Lastly, for systems that have a large number of semantic or syntactic tokens, a large number of hypothesis tokens can be generated during the parse. The large number of hypotheses makes the parse more complex and takes up a substantial amount of memory in the parsing system. Because of this, an effective tool is needed for managing parsing hypotheses.

SUMMARY OF THE INVENTION

The present invention provides a method for improving the efficiency of parsing text. Aspects of the invention include representing parse tokens as integers where a portion of the integer indicates the location in which a definition for the token can be found. In a further aspect of the invention, an integer representing a token points to an array of tokens that can be activated by the token. In another aspect of the invention, a list of pointers to partial parses is created before attempting to parse a next word in the text string. The list of pointers includes pointers to partial parses that are expecting particular semantic tokens.

A fourth aspect of the invention is a pruning technique that utilizes a data structure to list the semantic tokens that have been fully parsed for each span in the input text segment. When a token is fully parsed, the list is accessed to determine if the same token has been fully parsed for the same span before. If it has been fully parsed before, the structures associated with the existing semantic token and the new semantic token are compared to determine which of the two structures to retain for the span. A structure that is not retained is removed from further consideration.

BRIEF DESCRIPTION OF THE DRAWINGS

FIG. 5 is a block diagram showing a conversion from a token text string to a token ID.

FIG. 6 is a block diagram showing how token ID's point to the definition of a token FIG. 7 is a block diagram showing how a token ID can be used to find tokens that are activated by the token ID under embodiments of the present invention.

FIG. 10 is a span table with pointers to token structures that cover various spans of the input text.

FIGS. 11 and 12 are two parse structures for a root node that spans two words of text.

DETAILED DESCRIPTION OF ILLUSTRATIVE EMBODIMENTS

Figure 1:
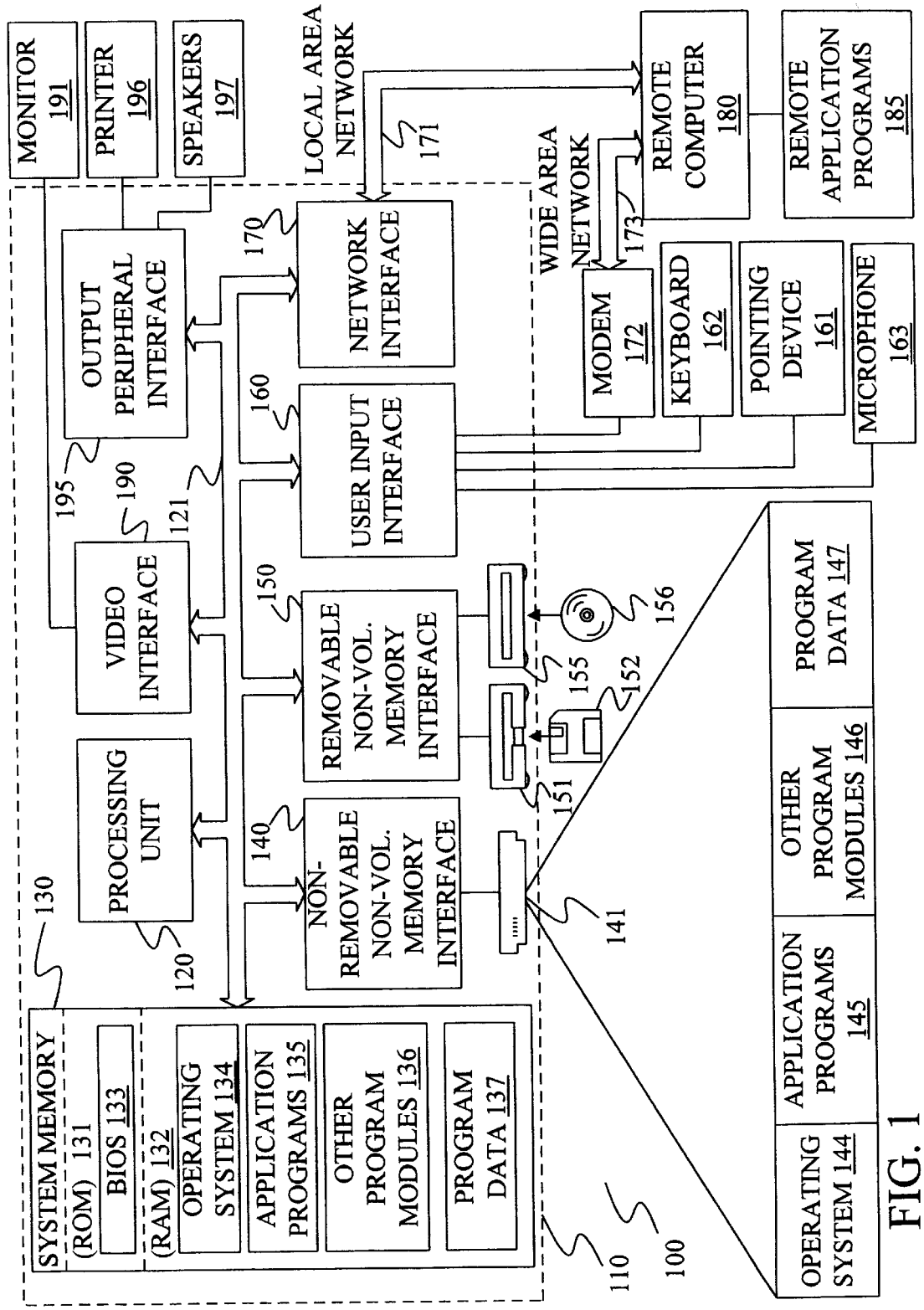
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
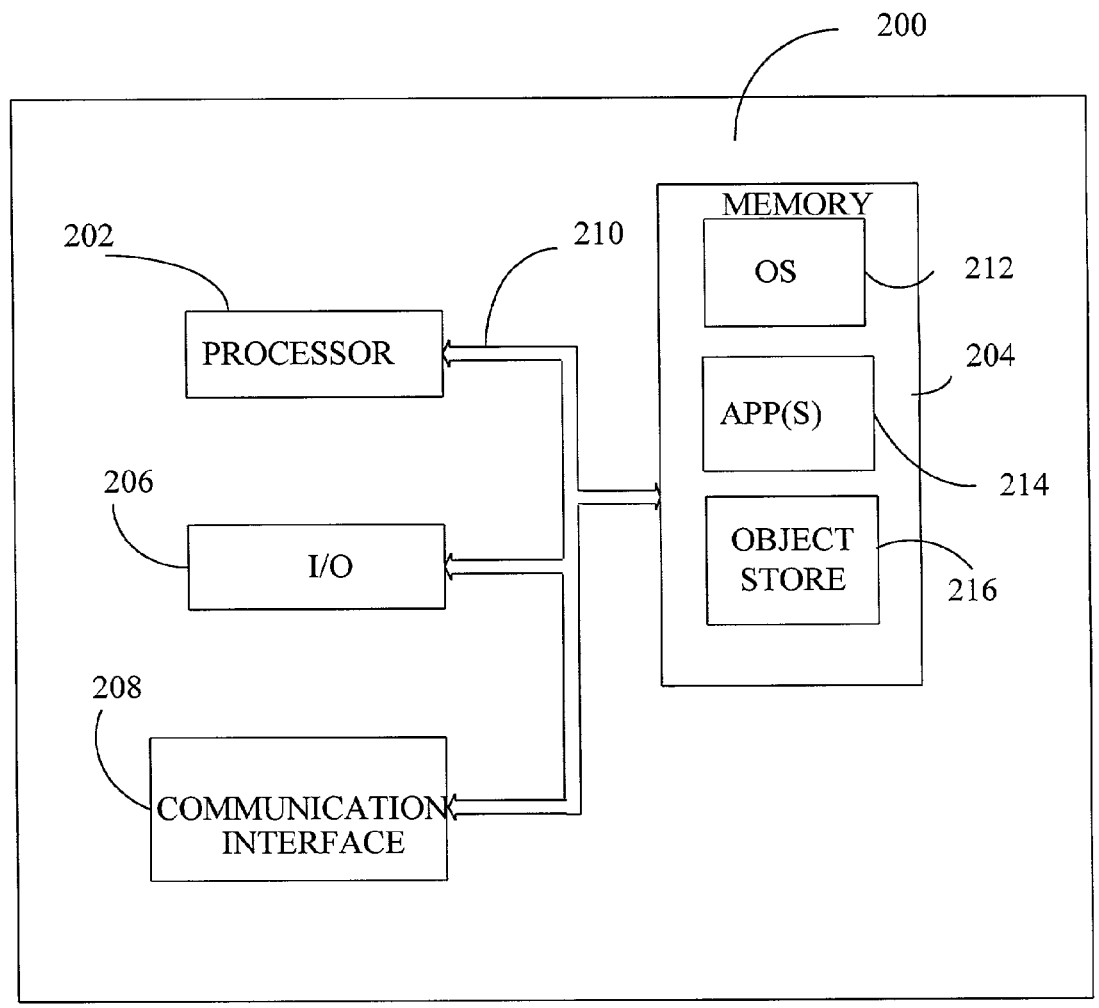
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
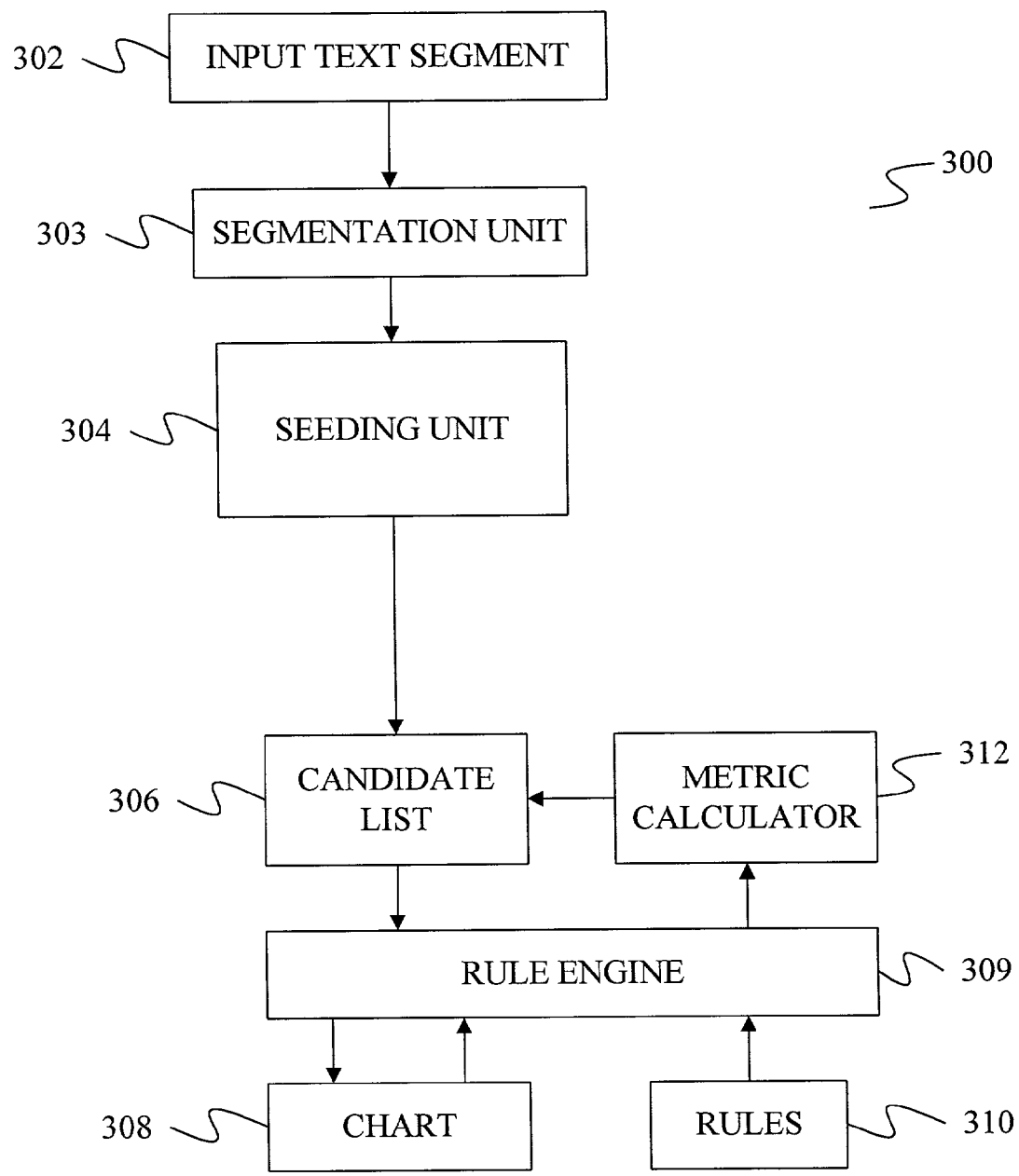
FIG. 3 is a block diagram of a natural language parser.
Figure 4:
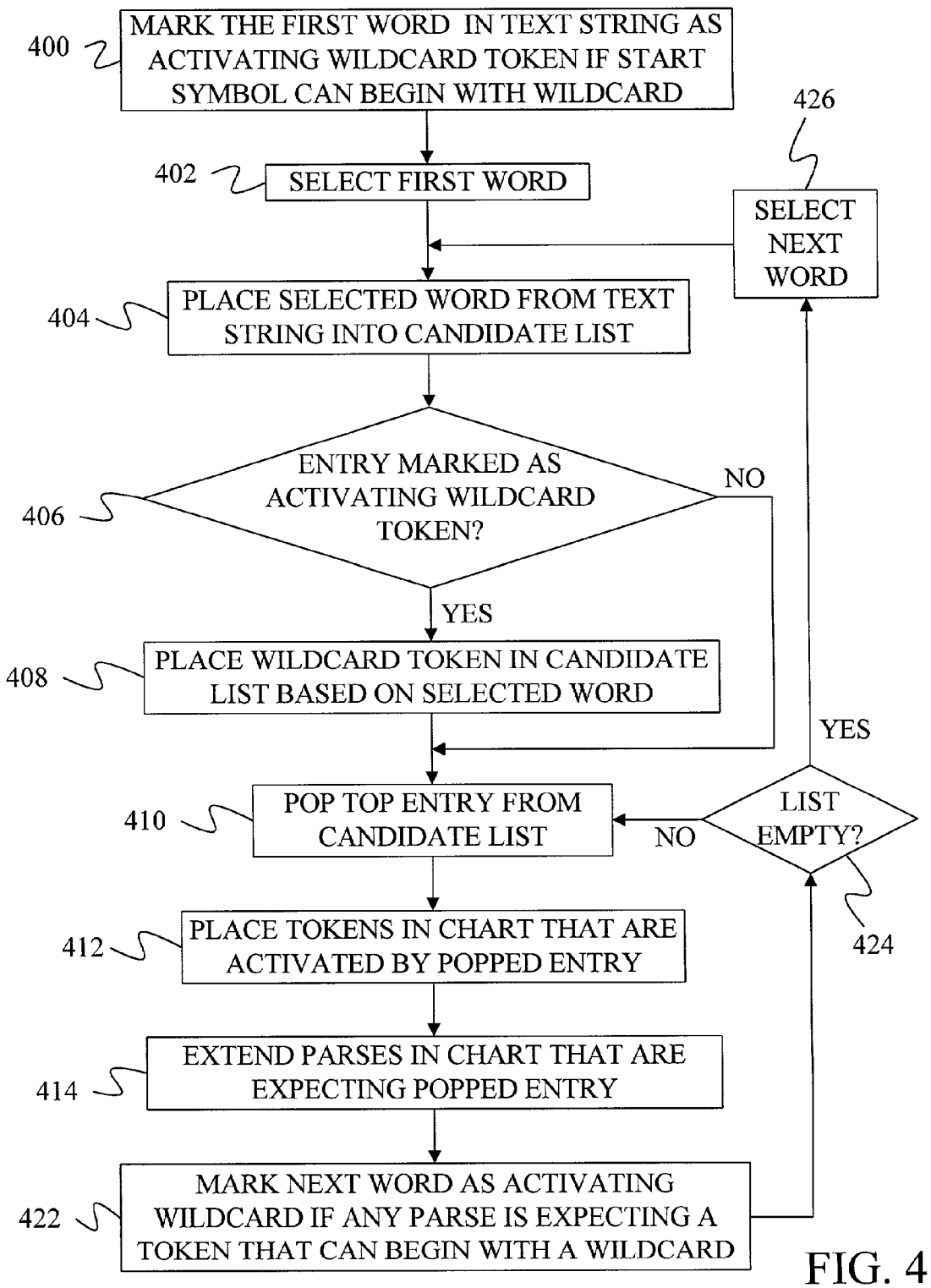
FIG. 4 is a flow diagram of a parsing technique under one embodiment of the present invention.

FIG. 3 provides a block diagram of a parser 300 in which the present invention may be practiced. FIG. 4 provides a flow diagram for parsing using parser 300. In parser 300, a segmentation unit 303 divides an input text segment 302 into individual words, which are passed to a seeding unit 304.

In step 400 of FIG. 4, the first word in the text string provided to seeding unit 304 is marked as activating a wildcard token if a <START> symbol in the grammar can begin with a wild card. After the marking, the first word in the string is selected by seeding unit 304 at step 402 and is placed in a candidate list 306 at step 404.

At step 406, the word or token placed in the candidate list at step 404 is examined to determine if it is marked as activating a wildcard token. A wildcard token is a token that can represent any word provided by the user. If the entry activates a wildcard token, a wildcard token is added to the candidate list at step 408. If not, the process of FIG. 4 continues at step 410.

At step 410, the top entry in the candidate list is "popped" or removed from the candidate list by a rule engine 309. Rule engine 309 uses the popped word to access a rule set 310 to identify tokens and related rules that are activated by the popped token. A token is said to be activated by a word or other token according to a related rule when the word or other token is the first child node in the related rule for the token. In a left-to-right parser, the first child node is the left-most child. For example, the semantic token <Meeting Property> is defined with rule <about><subject>, where <about> is the left-most child node and <subject> is the right-most child node.

At step 412, the activated tokens, together with the related rule, are placed in a chart 308. If the activated token is fully defined by the current word, the token is also placed in candidate list 306.

The word from the candidate list is also compared to partial parses in chart 308 at step 414 to determine if the partial parses can be extended by the popped word. Partial parses that can be extended but not completed by the word are extended, which results in new partial parses that are placed in chart 308. Partial parses that are completed by the word results in full parses that are placed in candidate list 306.

Under many embodiments, before a token is placed in candidate list 306, it is scored by a metric calculator 312 based on some scoring metric. Under one embodiment, the scoring metric is based on the span of words covered by the token, the number of levels of tokens formed beneath the token, and the total number of tokens beneath the token. The score provided to a token is used to order the tokens in candidate list 306 so that tokens that are more likely to appear in the final parse are popped before other tokens.

After the parses have been extended in step 414, the next word in the text string is marked as activating a wildcard if any of the partial parses in chart 308 is expecting a token that can begin with a wildcard. This is shown as step 422 in FIG. 4. Rule engine 309 then checks candidate list 306 at step 424 to determine if there are any other tokens that should be popped. If there are more tokens, the process of FIG. 4 returns to step 410.

Rule engine 309 continues to remove the tokens placed in the candidate list one at a time. For each token, rule engine 309 determines if another token is activated by the popped token and whether any partial parses can be extended based on the popped token. It then updates the chart and candidate list. This continues until all of the tokens have been removed from the candidate list. When the candidate list is empty at step 424, the next word in the text string is selected at step 426 and the process returns to step 404.

Aspects of the present invention improve the efficiency of rule engine 309 by reducing the amount of time needed to locate the definition for a token, by reducing the time needed to identify tokens that are activated by a popped word or token from the candidate list, and by reducing the time needed to identify partial parses that can be extended by a popped word or token. In addition, aspects of the invention provide a way to reduce the number of partial parses that are formed by allowing some completed tokens to be pruned from further consideration.

One embodiment of the present invention improves the efficiency identifying the definition of a token by representing the token as an integer that points to its definition. As shown in FIG. 5, this embodiment converts a token 500 into a token id 504 using a token hash table 502.

Under one embodiment, the token id for a token contains two parts. This can be seen in FIG. 6, where token ID 610 is shown to contain a first part 611 and a second part 612 and token ID 620 is shown to contain a first part 621 and a second part 622. Second parts 612 and 622, which in many embodiments are formed by the last three bits of the token ID, each point to a table, such as tables 630 and 640, respectively, that contain definitions for non-terminals. First parts 611 and 621 provide offsets within their respective tables to the beginning of the definition for the token, such as definition 631 of table 630.

Note that by using a token id that provides a pointer to a table, the present invention is able to accommodate different formats for the definitions of different kinds of non-terminals. Thus, definitions for tokens in one table could be of a different format from the definitions of tokens in a second table. This flexibility is made possible by the fact that the token id's pointer to the table indicates to rule engine 309 the type of token that is being accessed and thus the format of the token's definition.

For example, if the grammar includes semantic class tokens that are non-terminals of semantic significance and wildcard tokens that are non-terminals that can match anything, the format of the definitions in a semantic class token table 630 can be different from the format of the definitions in a wildcard table 640.

Thus, the token IDs of the present invention provide quick access to the definition for a token. These definitions can include a number of different types of information about the token. For example, in FIG. 6, token definition 631 is shown as containing properties 650 and rules 652. Properties 650 can include such information as whether or not the token can begin with a wildcard as shown by property entry 651 in FIG. 6. This information is used in step 422 to determine if a next token in a partial parse can begin with a wildcard. Rules 652 provide a set of rules that are each formed of a sequence of token IDs representing non-terminals and/or words that can be parsed to form the token defined by token definition 631. Thus, token ID 653 represents the first token in a string of tokens that can be parsed to form the token of definition 631. Similarly, token ID 654 represents the first token in a second sequence of tokens that can be parsed to form the token of definition 631.

In a second embodiment of the invention, the token IDs are used to identify tokens that can be activated by a token. This improves the efficiency of step 412 in which rule engine 309 places tokens in chart 308 that are activated by the token popped from the candidate list. An embodiment for performing this function is shown in the block diagram of FIG. 7.

Under the embodiment of FIG. 7, the token IDs are not used directly because they are not consecutive. This occurs because the last three bits of the Token IDs point to the table, and unless there are 8 tables and an equal number of token definitions in each table, the Token IDs will not be consecutive.

Instead of using the nonconsecutive token IDs, the embodiment of FIG. 7 converts the token IDs into a set of consecutive global token IDs. Thus, when rule engine 309 is trying to find the tokens that are activated by a token, it converts the token ID 700 for the token into a global token ID 704 using a token ID to global token ID converter 702.

The global token ID 704 represents an offset into an array of cells 706, which contains a separate cell for each token. The offset identifies the cell for the token and the cell, in turn, contains a pointer to a second array, such as array 710 of FIG. 7.

Each element of array 710 provides a separate token ID of a token that can be activated by the token popped from the candidate list. For example, cell 712 of array 710 provides the token ID of a token (B) that can be activated by a token (A) popped from the candidate list. This token ID is used to locate the definition 718 for the activated token (B). Element 712 also contains an offset to the location of the rule 720 in the token definition that licenses the activation of the token (B) by the popped token (A). This allows rule engine 309 to quickly identify the tokens that will be added to the chart as the partial parse of the activated token. This partial parse will indicate which tokens have been popped from the candidate list and which tokens are still needed to complete the parse. Note that the first token ID in the rule pointed to by element 712 should be the token ID of the popped token (A).

By utilizing integers to represent tokens, the present invention is able to improve the efficiency of identifying tokens that are activated other tokens. In particular, the present invention does not require that a textual representation of the tokens be used to identify the other tokens that can be activated. Instead, the integer representation is used to point to an array of tokens that can be activated by the token.

A third embodiment of the present invention provides an efficient mechanism for identifying partial parses in chart 308 that can be extended by an entry popped from the candidate list. In particular, as partial parses are formed or extended, a pointer to the partial parse is placed in a hash table assigned to the word that was last popped from the candidate list. The hash table maps a token ID to an array of partial parses that need that token ID to be extended. Thus, if two partial parses required the same token to be extended, the hash table would map the token ID for the token to an array containing the two partial parses.

Figure 8:
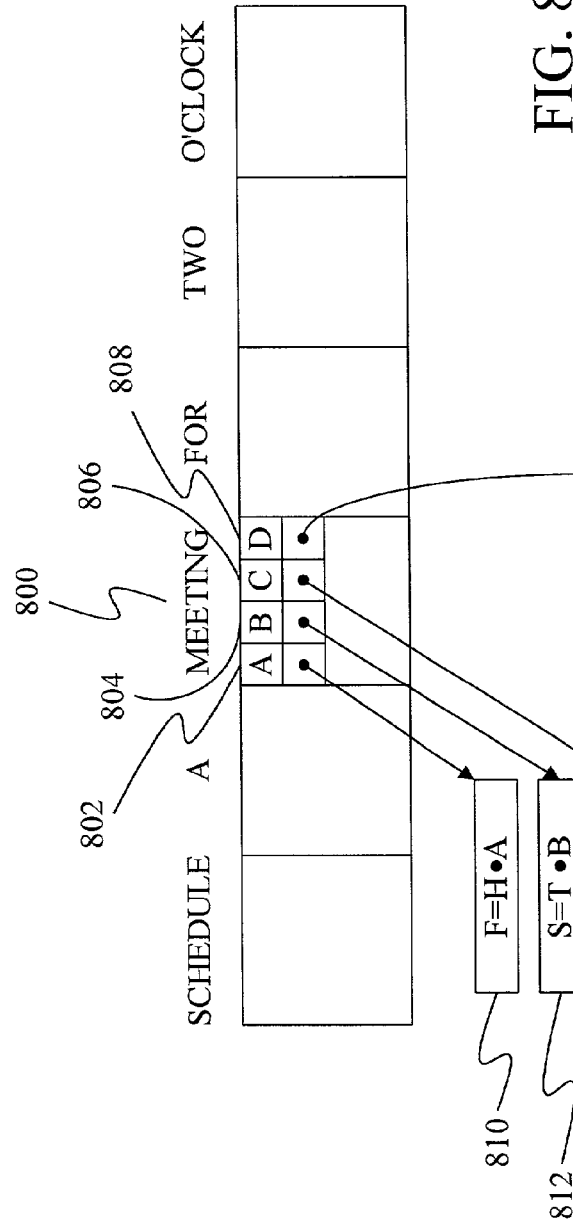
FIG. 8 is a diagram showing mappings from token ID's to arrays of partial parses under embodiments of the present invention.

FIG. 8 provides an example of a partial parse hash table 800 for the word "meeting" in the input text "schedule a meeting for two o'clock". Table 800 includes four token ID mappings 802, 804, 806, and 808 for the tokens A, B, C and D, respectively.

Token ID mapping 802 for token A provides a partial parse array 810 that contains a single partial parse for a token "F". In FIG. 8 the partial parse of token F is indicated by an equation with the token F on the left side of the equation and the tokens or words that form token F on the right side of the equation. In FIG. 8, a dot is placed to the right of the last token or word that was received for the partial parse. Thus, the token or word to the right of the dot represents the next token or word that is needed to extend the partial parse.

Like mapping 802, mappings 804 and 808 include pointers to arrays 812 and 814, respectively, that each include a single partial parse. Mapping 806, for token "C", includes a pointer to an array 820 that includes two partial parses 821 and 822. Partial parse 821 is for a token "J" and partial parse 822 is for a token "M". Both partial parse 821 and partial parse 822 need a token "C" to extend their parses.

Any partial parses that are newly created based on the current word or that are extended but not completed at the current word position, are examined to determine the token ID that is needed to extend them. Partial parses that need the same token ID are grouped together in an array. Mappings between the token ID's and their respective partial parse arrays are then stored in a hash table for the next word position.

Under some embodiments, robust parsing is supported by allowing for word skipping. Under such embodiments, hash tables for past word positions are examined when a token is popped from the candidate list. If one of the past hash tables points to a partial parse that can be extended by the current token ID, the partial parse is extended while skipping the words popped between the current word and the position of the past hash table.

By using mappings to the partial parses, the present invention is more efficient than the prior art in that the system does not have to search through all of the partial parses to determine if any of them are waiting for a word or token popped from the candidate list. Instead, the token ID of the popped word or token can be used to link directly to an array of all of the partial parses that are expecting that token or word. If the popped token or word does not have a mapping in the hash table, then there are no partial parses that are expecting the token or word. In prior art systems, a popped token or word would have to be compared to each partial parse to determine if the partial parse is expecting the token or word. As such, the present invention is faster than most prior art systems.

Another aspect of the present invention provides an efficient means for pruning tokens to reduce the complexity of parsing text. Under one embodiment, this pruning is achieved by limiting the number of same tokens that can span the same set of words in the input text string. Thus, the number of tokens "A" that span from word n to word n+i is limited.

Figure 9:
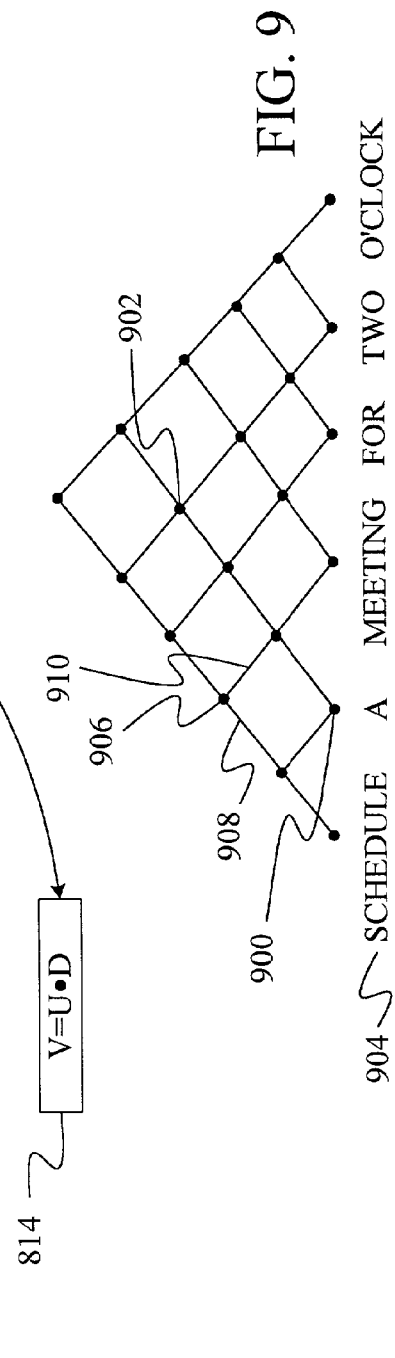
FIG. 9 is a diagram showing spans for an input text string.

The possible spans for a token are shown in the structure of FIG. 9 where each node, such as nodes 900 and 902, represents a different span of input text segment 904 "schedule a meeting for two o'clock". For example node 900 spans the single word "a" while node 902 spans the words "a meeting for two". To find the words spanned by a node, the lines extending down from the node are simply followed to the two words they end at. For example, to find the span for node 906, line 908 is followed to the word "schedule" and line 910 is followed to the word "meeting". Thus, node 906 spans the section of text "schedule a meeting".

FIG. 10 provides a table structure that is used by one embodiment of the present invention to locate tokens of particular spans that have previously been generated from the text string. In FIG. 10, each token, or root, occupies a separate column such as columns 1000, 1002, and 1004. For each column, there is a separate entry for each span available in the text segment. For example, entry 1008 of column 1000 spans from the third word to the fifth word. Each entry contains one or more pointers to structures that have previously been generated for the token at that span. Note that there will only be as many pointers as the allowed number of same tokens for a span. Thus, if only a single structure is allowed for a token at a particular span, only a single pointer will be found in the entry. However, if two structures are allowed for the same token and same span, up to two pointers can be found in an entry.

FIGS. 11 and 12 show two structures for a same token that spans a same text segment. In both FIG. 11 and FIG. 12, the token <Person Container> (PC) spans the words "John Smith" in the text segment. In the structure of FIG. 11, there are four layers, 1100, 1102, 1104 and 1106. In the structure of FIG. 12 there are five layers 1200, 1202, 1204, 1206 and 1208.

If the PC token of FIG. 11 has previously been popped from the candidate list, a pointer to the structure would have been added to a table such as the table of FIG. 10. If the PC token of FIG. 12 was later popped from the candidate list, the token and its span would be used to access the table of FIG. 10 to determine if the same token had been popped for the same span before.

In an embodiment where only a single pointer is allowed, a decision must be made between the previously stored structures and a structure that will exceed the limit of allowed structures for a token and span. For example, if only one structure is allowed for a token and span, then a decision would have to be made between the structure of FIG. 11 and the structure of FIG. 12.

Under embodiments of the present invention, several criteria can be used for selecting between two structures for the same token and span. In particular, preferences can be given to those structures that skip fewer input words, that skip fewer symbols in the parse tree, include fewer nodes, and have fewer levels (in that order). Thus, the structure of FIG. 11 would be preferred over the structure of FIG. 12 since the structure of FIG. 11 has fewer nodes.

If a newly popped token is selected over a previously stored token, the previously stored token must be replaced with the newly popped token in all of the partial parses that use the previously stored token.

Note that the sequential order in which tokens are popped from the candidate list is important under the present invention. In particular, the inventors have discovered that tokens that represent smaller spans should be taken from the candidate list before tokens that represent larger spans. In addition, for tokens with the same span, the one with high score should be given high priority. In addition, tokens that cover the word closest to the sentence start position should be given priority over tokens that have a span that is later in the sentence.

By limiting the number of same tokens that may span the same set of words, the present invention reduces the complexity of the parser by limiting the number of parse structures that have to be maintained in the chart. This increases the speed of the parser.

Although the present invention has been described with reference to preferred embodiments, workers skilled in the art will recognize that changes may be made in form and detail without departing from the spirit and scope of the invention.

What is claimed is:

1. A method of parsing text to form a representation of the text, the representation having structures that span sub-strings of words in the text, each structure having a token at its root, the method comprising:

identifying a first structure that spans a first sub-string of words in the text and has a first token as its root, the first sub-string having a starting position and an ending position;

indexing the first structure by the first token and the starting position and ending position of the first sub-string;

identifying a second structure that spans the first sub-string of words and has the first token as its root;

using the first token and the starting position and ending position of the first sub-string to locate the first structure; and removing one of the first structure and second structure from further consideration in the formation of the representation of the text.

2. The method of claim 1 wherein removing one of the first structure and second structure comprises removing the second structure.

3. The method of claim 1 wherein removing one of the first structure and second structure comprises removing the first structure.

4. The method of claim 3 wherein removing the first structure comprises removing the first structure so that it is no longer indexed by the first token and the starting position and ending position of the first sub-string and indexing the second structure by the first token and the starting position and ending position of the first sub-string.

5. The method of claim 1 wherein removing one of the first structure and the second structure comprises comparing the first structure to the second structure to determine which structure is better for the representation of the text.

* * * * *